US005198168A

United States Patent [19]
Thurston

[11] Patent Number: 5,198,168
[45] Date of Patent: Mar. 30, 1993

[54] METHOD FOR PROVIDING AN INLAY ON A SUBSTRATE

[76] Inventor: Royce N. Thurston, 1523 Upper James, Hamilton, Ontario, Canada, L9B 1K2

[21] Appl. No.: 819,848

[22] Filed: Jan. 13, 1992

[30] Foreign Application Priority Data

May 29, 1991 [CA] Canada ................................ 2043471

[51] Int. Cl.[5] ................................ C04B 41/00

[52] U.S. Cl. ................................ 264/132; 264/129; 264/162; 264/345; 264/347; 264/DIG. 65

[58] Field of Search ............... 264/129, 132, 138, 162, 264/234, 236, 345, 347, DIG. 65

[56] References Cited

U.S. PATENT DOCUMENTS 3,420,925 1/1969 Sharif ................................ 264/102
3,463,653 8/1969 Lether ................................ 264/162
3,852,145 12/1974 Kloweit ................................ 264/138
4,036,929 7/1977 Gould ................................ 264/132
4,355,808 10/1982 Jarnigan et al. ................................ 264/129
4,737,403 4/1988 Simpson et al. ................................ 427/389.8
4,844,850 7/1989 Harder ................................ 264/129

FOREIGN PATENT DOCUMENTS 227192 8/1958 Australia ................................ 264/132
61-118238 6/1986 Japan ................................ 264/129

*Primary Examiner*—Jay H. Woo
*Assistant Examiner*—Robert B. Davis
*Attorney, Agent, or Firm*—Shoemaker & Mattare, Ltd.

[57] ABSTRACT

A method for providing an inlay on a substrate includes providing a recess in the substrate, preheating the substrate to a temperature of approximately 150° F., mixing an epoxy resin with an epoxy hardener, and placing the mixture into the recess so that the mixture hardens in the recess and the heat stored in the substrate reduces the viscosity of the mixture, to aid in the removal of bubbles.

13 Claims, 1 Drawing Sheet

METHOD FOR PROVIDING AN INLAY ON A SUBSTRATE

This invention relates generally to a method for providing an inlay on a substrate, and has particularly to do with an improved method by which epoxy inlays on various kinds of substrates can be more effectively degassed.

DEFINITIONS

Throughout this disclosure and in the appended claims, the terms epoxy resin, epoxy hardener and epoxy thinner are used.

Epoxy Resin

The term epoxy resin designates a thermosetting resin based on the reactivity of the epoxide group

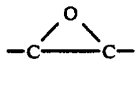

One common type is constituted by the resins made from epichlorohydrin and bisphenol A. Molecules of this type have glycidyl ether structures in the terminal positions, have many hydroxyl groups, and cure readily with an amine as a hardener. Another common type is a resin made from polyolefins oxidized with peracetic acid as the hardener. These have more epoxide groups in the inside of the molecule as well as in terminal positions, and can be cured with anhydrides.

Suitable Epoxy Resin

A suitable epoxy resin is one sold under the designation T-88A by Niagara Paint & Chemical Ltd, 2 Hillyard St., Hamilton, Ontario, Canada, L8L 7W4. It has a specific gravity of 1.164.

Epoxy Hardener

A suitable epoxy hardener for use with the resin identified in the preceding paragraph is one sold under the designation T-88B by Niagara Paint & Chemical Ltd. (address given above). This hardener contains 58.2 % by weight of polyamide resin, 5% by weight of alkyl phenol and 5% by weight of tri(dimethyl-aminomethyl)phenol, and has a specific gravity of 0.969.

Epoxy Thinner

A suitable epoxy thinner for use with the resin and hardener identified in the two preceding paragraphs is one sold under the designation Klenk's Epoxy Thinner, by Swing Paints Ltd, 2100 St. Patrick, Montreal, Quebec, Canada, H3K 1B2. It is a clear liquid which includes 2-ethoxyethanol and toluol and has a boiling point between 110 degrees C. and 136 degrees C.

Coloring Agents

Various coloring agents can be used in the method of this invention.

One such coloring agent is a carbon black available from Columbian Chemicals Canada Limited at 755 Parkdale Avenue North, Hamilton, Ontario, Canada, or from Columbian Chemicals Co., at 1600 Parkwood Circle, Suite 400, Atlanta, Ga., U.S.A. 30339. This material is sold under the designation Raven 16 Powder, also known as R16, with identification number SA 07692. This material is an amorphous, black, odorless solid with a specific gravity between 1.7 and 1.9.

Another coloring agent is bronze powder, available from United States Bronze Powders, Inc., P.0. Box 31, 408 Route 202, Flemington, N.J., U.S. 08822, under the designations: B-401, B-402, B-406, B-408, B-409, B-432. The bronze powder is an alloy of copper and tin, containing between 50% and 90% by weight copper.

A further coloring agent is brass powder, obtainable from United States Bronze Powders, Inc., available from the same source as the bronze powder referred to above. The brass powder contains 70–92% by weight copper, from 7–29% by weight of zinc, and from 0.2–1.7% by weight of aluminum. The material is sold under item numbers: B-103, B-107, B-108, B-109, B-176, B-177, B-178, B-182.

A white pigment useful for an opeque inlay is sold by Ink Dezyne International Ltd at 925 Roselawn Ave., Toronto, Ontario, Canada, M6B 1B7 under designations R103 and R105. This material is a dyed triazinealdehyde-amide resin.

A further white pigment useful for making an opaque inlay is also sold by Ink Dezyne International Ltd. (address above), under the designation CD-475. Again this material is a dyed triazine-aldehyde-amide resin.

An opaque white pigment suitable for use herein is a titanium dioxide pigment sold under the trade name "Titanox", sold by Ink Dezyne International Ltd., of which the address is given above.

Yet another material useful with this invention is a toner, which may be transparent or opaque, sold under the designation UT-000 by Ink Dezyne International Ltd., of which the address is given above. The trade name is "Universal Toner", and it is normally used as an ink toner for screen printing. This toner includes from 10% to 30% by weight of petroleum distillate, and from 10% to 30% by weight of alkylphenol ethoxylate.

BACKGROUND OF THIS INVENTION

It is known to provide an inlay on a substrate such as a plaque of plastic material or a plate of a material like brass or other metal, in which a recess is first provided on the substrate, and then a mixture of slow-setting epoxy is placed into the recess and allowed to harden. In this conventional process, a particular problem is encountered, having to do with the fact that the epoxy, as it hardens, generates tiny bubbles of gas. While the epoxy mixture retains its original liquid consistency, and before it begins to harden to any appreciable degree, the tiny bubbles of gas that are generated by the chemical reaction between the resin and the hardener can float upwardly toward the free surface of the epoxy. However, as the hardening process continues, bubbles of gas continue to be produced, and a point is reached where the hardening process has so increased the viscosity of the mixture that the tiny gaseous bubbles can no longer rise through the epoxy, and become trapped. As a result, the final inlay resulting from the hardening of the epoxy is riddled with tiny bubbles constituting a multiplicity of small voids throughout the epoxy.

In the final finish step for the inlay, any excess epoxy (projecting above the plane of the top surface of the plaque or plate) is removed by sanding or grinding, and then, if desired, a final polishing step can be included in order to give the epoxy inlay as smooth and glossy an appearance as possible. The problem, of course, is that the tiny voids throughout the epoxy, resulting from the gaseous bubbles, cause irregularities in the form of tiny pockets covering the entire surface of the smooth (and optionally polished) surface. This makes it impossible to provide a smooth and integral (unbroken) polished surface.

GENERAL DESCRIPTION OF THIS INVENTION

In view of the foregoing problems associated with the prior art, it is an object of one aspect of this invention to provide an improved method for providing an inlay on a substrate, the improved method being such as to avoid the occurrence of tiny voids or pockets in a polished upper surface of the inlay.

More particularly, this invention offers, in a method of providing an inlay on a substrate which includes the steps of:

a) providing a recess on the substrate,
b) mixing an epoxy resin with an epoxy hardener,
c) and placing the mixture resulting from b) into the recess, so that the mixture hardens in the recess, the improvement consisting of preheating the substrate to a temperature at least as high as 140° F., prior to placing said mixture into the recess, whereby the heat stored in the substrate aids in the removal of bubbles from the mixture, by reducing the mixture viscosity.

Further, this invention offers a method of providing an inlay on a substrate having a top surface, comprising the steps:

a) providing a recess in the top surface of said substrate,
b) preheating the substrate to a temperature at least as high as 140° F.,
c) mixing an epoxy resin with an epoxy hardener,
d) placing the mixture resulting from c) into the recess, so that the mixture hardens in the recess, whereby the heat stored in the substrate reduces the viscosity of the mixture and aids in the removal of bubbles therefrom, and
e) removing any portion of the hardened mixture projecting above the top surface.

GENERAL DESCRIPTION OF THE DRAWINGS

One embodiment of this invention is illustrated in the accompanying drawings, in which like numerals denote like parts throughout the several views, and in which.

DETAILED DESCRIPTION OF THE DRAWINGS

Figure 1:
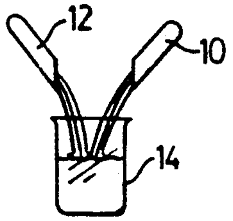
FIG. 1 shows schematically the mixture of two epoxy ingredients (epoxy resin and epoxy hardener) in a container.

The making of an epoxy plastic requires firstly that the two components of the epoxy be mixed together. These components are typically referred to as the epoxy resin and the epoxy hardener. FIG. 1 shows a first container 10 containing the epoxy resin, a second container 12 containing the epoxy hardener, and a receptacle 14 for receiving a mixture of the components in containers 10 and 12.

Figure 2:
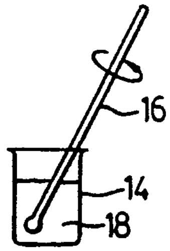
FIG. 2 shows schematically the step of mixing the epoxy components.

FIG. 2 shows the receptacle 14 with a stirring mechanism 16 extending down into the mixture 18 of the epoxy resin and the epoxy hardener. It will be understood that FIGS. 1 and 2 are highly schematic, and merely represent the essential process of mixing and stirring the two components of the epoxy in order to create an intimate mixture.

Figure 3:
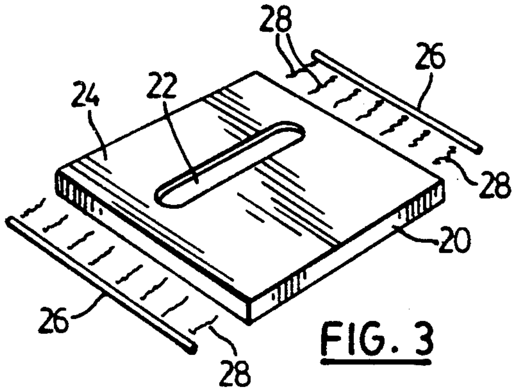
FIG. 3 is a perspective view of a plaque having a recess for receiving an inlay, the plaque receiving heat.

FIG. 3 shows a plaque 20 which, in the illustration, is approximately square in plan view and is of uniform thickness. A recess 22 in the form of an elongate groove has been machined into the top surface 24 of the plaque 20. It will be understood that the recess 22 could be provided in a number of ways, for example by molding the recess 22 into the plaque 20 at the time of the creation of the latter.

Figure 7:
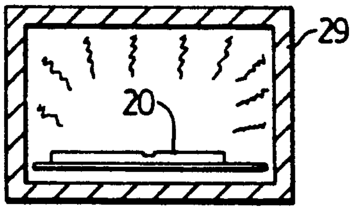
FIG. 7 is a sectional view through an oven, showing the preheating of the plaque.

The improvement of this invention involves the preheating of the plaque 20 to a temperature as least as high as 140° F., and preferably about 150° F., prior to pouring the resin into the recess 22. In fact, the normal order of events would involved preheating the plaque 21, then mixing the components of the epoxy as shown in FIGS. 1 and 2, then pouring the mixture into the recess 22 while the plaque 20 remains at or about the preheat temperature of 140° F. or more. In FIG. 3, the bars 26 are intended schematically to represent a heating means, for example an oven. The wavy lines 28 represent radiant heat. FIG. 7 shows an oven 29 in the process of preheating the plaque 20 to the required temperature. The plaque 20 lies on a support (such as a grill) within the oven 29.

Figure 4:
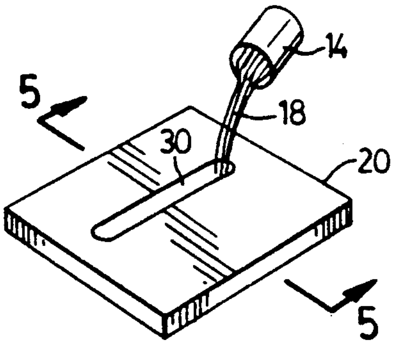
FIG. 4 shows the plaque of FIG. 3 at the end of the step involving the pouring of the mixed epoxy into the slot.

FIG. 4 depicts the pouring of the mixture 18 from the receptacle 14 into the recess 22, thus providing an epoxy inlay 30 which as yet is in the liquid condition. As the epoxy resin and the epoxy hardener react with each other, tiny gaseous bubbles are created throughout the body of the epoxy, and these bubbles seek to move upwardly through the epoxy toward the upper, open surface. In the prior art process, in which the plaque 20 is not preheated, the onset of hardening acts to trap a multiplicity of these tiny bubbles within the body of the epoxy, in such a way that they can no longer reach the upper surface. I have found, however, that by preheating the plaque 20, the latter acts as a heat-storing device which adds heat to the epoxy mixture in the recess 22, and decreases the viscosity in such a way that virtually all of the tiny bubbles created by the hardening process are enabled to reach the top surface of the epoxy before the latter hardens.

Figure 5:
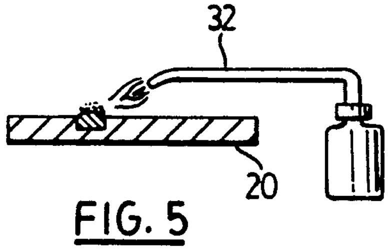
FIG. 5 shows an optional step for removing unbroken bubbles from the top of the epoxy.

Under some conditions, for example when the temperature of the plaque 20 is a few degrees below 140° F., there may be a tendency for the rising bubbles to accumulate on the surface of the epoxy, without breaking. I have found however, that such accumulating bubbles can be broken and made to disappear by using a hand-held torch such as that shown schematically at the number 32 in FIG. 5. I have also found that by using a plaque temperature of 150° F., it becomes unnecessary to use a hand-held heating device. The bubbles simply break as they reach the surface.

Figure 6:
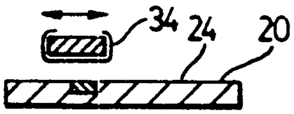
FIG. 6 shows schematically the sanding down of the top of the inlay.

After the epoxy has fully hardened, it is possible to utilize a grinding or sanding device such as that shown schematically at 34 in FIG. 6, to remove all parts of the epoxy which project above the top surface 24 of the plaque 20. Following this removal, a polishing step may take place, the polishing step being known per se.

Because the heat stored in the plaque 20 is available to maintain a high temperature in the epoxy while it is setting, I have found that it is possible to use the epoxy resin and hardener identified at the beginning of this disclosure as T-88A and T-88B, which is normally regarded as a slow-acting combination. This combination, when used at room temperature, takes about 24 hours to dry and about one week to cure. Using this mixture, and the heat stored in the plaque 20, I have found that the epoxy insert can be fully finished and hardened in about 30 minutes (generally between 20 and 45 minutes).

I have further discovered that the use of recommended amounts of the epoxy thinner identified at the beginning of this disclosure, even at a plaque temperature of around 140° F., permits the elimination of the use of blowtorch 32. The thinner appears to allow the bubbles to rise and break on their own, without collecting in the form of foam on top of the epoxy insert.

Tests have been carried out using a variety of substrate materials as the plaque 20. For example, an epoxy plate material, usually containing colouring agents and/or fillers, is currently sold under the name of Corian (trade-mark). A typical Corian thickness is anywhere from ¼ inch to ¾ inch. I have also discovered that this improved process can be carried using metal plates as the substrate, such as those made of brass or copper.

Following the partial curing of the epoxy inlay, and after all of the bubbles have reached the surface and have disappeared, the plaque may be returned to a heating oven or placed under heat lamps for approximately 20 to 40 minutes, depending on the depth of the inlay material. At that point, the plaque is removed from the source of heat, and allowed to cool thoroughly prior to sanding the inlay smooth.

It is to be understood that the epoxy constituting the inlay can contain various thinners, pigments and toner inks in order to achieve the appearance, colour and shade desired. I have also discovered that powdered metal of various kinds can be added to the epoxy. This will result in an inlay having a surface that appears metallic.

EXAMPLE EPOXY MIXTURES

Opaque Inlays

1) T-88 A & B are mixed one-to-one by volume using a graduated measuring cup. These components are then mixed thoroughly so that streaks cannot be seen.

2) Add 10% of Swing Epoxy Thinner, in order to thin the mixture and help promote the rise of bubbles.

3) Add 2% of 2020 white pigment, in order to make the epoxy opaque.

4) Add enough Universal Toner Ink to achieve the shade of colour desired. Mix thoroughly so that the streaks cannot be seen.

Fluorescent Colours

1) T-88 A & B are mixed one-to-one by volume using a graduated measuring cup. Mix thoroughly so that the streaks cannot be seen.

2) Add 20% of Swing Epoxy Thinner, to thin the epoxy and thus promote the rise of bubbles.

3) Add 20% fluorescent pigment, mixing thoroughly until streaks can no longer be seen.

Transparent Colours

1) T-88 A & B are mixed one-to-one by volume using a graduated measuring cup. Mix thoroughly until streaks can no longer be seen.

2) Add 10% Swing Epoxy Thinner, to thin the epoxy and promote the rise of bubbles.

3) Add Universal Toner to achieve desired colour, mixing thoroughly until the streaks cannot be seen.

In the appended claims, the word "substrate" is utilized to cover plaques such as that shown at 20 in FIG. 3, and also metal plates.

While one embodiment of this invention has been illustrated in the accompanying drawings and described hereinabove, it will be evident to those skilled in the art that changes and modifications may be made therein without departing from the essence of this invention, as set forth in the appended claims.

The embodiments of the invention in which an exclusive property or privilege is claimed are defined as follows:

1. In a method of providing an inlay on a substrate which includes the steps of:
a) providing a recess on the substrate,
b) mixing an epoxy resin with an epoxy hardener,
c) and placing the mixture resulting from b) into the recess, so that the mixture hardens in the recess,
the improvement consisting of preheating the substrate to a temperature at least as high as 140° F., prior to placing said mixture into the recess, whereby the heat stored in the substrate aids in the removal of bubbles from the mixture.

2. The method claimed in claim 1, in which the temperature to which the substrate is heated is substantially 150° F.

3. A method of providing an inlay on a substrate having a top surface, comprising the steps:
a) providing a recess in the top surface of said substrate,
b) preheating the substrate to a temperature at least as high as 140° F.,
c) mixing an epoxy resin with an epoxy hardener,
d) placing the mixture resulting from c) into the recess, so that the mixture hardens in the recess, whereby the heat stored in the substrate reduces the viscosity of the mixture and aids in the removal of bubbles therefrom, and
e) removing any portion of the hardened mixture projecting above the top surface.

4. The method claimed in claim 3, further including adding an epoxy thinner to the epoxy combination during step c).

5. The method claimed in claim 3, in which step e) is followed by the step:
f) sanding and polishing the inlay so that it exhibits a smooth outer surface coplanar with said top surface.

6. The method claimed in claim 3, in which, during the hardening of the mixture, a hand-held torch is used to break any bubbles that rise to the top of the epoxy mixture but resist breaking.

7. The method claimed in claim 3, in which the temperature to which the substrate is heated is substantially 150° F.

8. The method claimed in claim 3, in which, after the at least partial hardening of the epoxy, the substrate is subjected to additional heating.

9. The method claimed in claim 3, further including adding a coloring agent to the epoxy combination during step c).

10. The method claimed in claim 9, further including adding a filler to the epoxy combination during step c).

11. The method claimed in claim 3, further including adding an epoxy thinner and a coloring agent to the epoxy combination during step c).

12. The method claimed in claim 3, further including adding a coloring agent and a filler to the epoxy combination during step c).

13. The method claimed in claim 3, further including adding an epoxy thinner, a coloring agent and a filler to the epoxy combination during step c).

* * * * *